United States Patent [19]

Olenick et al.

[11] Patent Number: 4,998,290

[45] Date of Patent: Mar. 5, 1991

[54] FREQUENCY-HOPPING RADIO COMMUNICATION NETWORK

[75] Inventors: Stephen M. Olenick, Oakhurst; Robert A. Johnson, Freehold; Russell E. Frydryck, Atlantic Highlands, all of N.J.

[73] Assignee: Canadian Marconi Corporation, Montreal, Canada

[21] Appl. No.: 191,538

[22] Filed: May 9, 1988

[51] Int. Cl.$^5$ .............................................. H04B 7/26
[52] U.S. Cl. ...................................... 455/53; 455/34; 455/62; 455/58
[58] Field of Search .................... 455/53, 54, 58, 68, 455/70, 71, 34, 62; 375/1, 38; 379/63, 62

[56] References Cited

U.S. PATENT DOCUMENTS

| | | | |
|---|---|---|---|
| 4,023,103 | 5/1977 | Malm | 455/62 |
| 4,066,964 | 1/1978 | Costanza et al. | 375/52 |
| 4,140,972 | 2/1979 | Enriquez et al. | 455/68 |
| 4,193,030 | 3/1980 | Rabow et al. | 375/1 |
| 4,193,031 | 3/1980 | Cooper | 455/68 |
| 4,355,399 | 10/1982 | Timor | 455/62 |
| 4,479,226 | 10/1984 | Prabhu et al. | 375/1 |
| 4,554,668 | 11/1985 | Deman et al. | 375/1 |
| 4,554,669 | 11/1985 | Deman et al. | 375/1 |

Primary Examiner—Douglas W. Olms
Assistant Examiner—Ralph Smith
Attorney, Agent, or Firm—Robin, Blecker, Daley & Driscoll

[57] ABSTRACT

A system for effecting radio communication over a given range of frequency channels among a plurality of participating local stations, includes: a variably settable channel transmission unit at each such participating local station; and a controller or central station having an interference array processor for receiving data characterizing the system and each such participating local station for assigning datum channels (frequencies) to each such participating station with prescribed channel spacing and what is termed a "book-page generator" for compiling data in successive book pages of initial and subsequent channel assignments for stations, with maintenance of such datum channel spacing. Further data compilations are made from the book-page generator in what are termed "station pages", comprising frequency shift instructions specific to the stations. Since a station page is derived from plural book pages, any station may be compromised without revelation of the contents of the book pages.

5 Claims, 5 Drawing Sheets

FREQUENCY-HOPPING RADIO COMMUNICATION NETWORK

FIELD OF THE INVENTION

This invention relates generally to radio communication and pertains more particularly to methods and systems for avoiding compromise in radio communication networks of the so-called "frequency-hopping" variety.

BACKGROUND OF THE INVENTION

In various applications in radio communication, a network communication requirement exists, i.e., a plurality of individual stations need transmit to and receive from one another. A foremost aspect of such network requirement is that of minimizing interference among the participating stations. A second aspect of such network requirement, particularly applicable in tactical military situations, is security, whereby compromise of the network is to be avoided. A particularly intolerable compromise situation is that of compromising the entire network by the compromise of a single participating station.

Prior art activity in network radio communication has involved numerous schemes and arrangements, as is indicated in the statement pursuant to 37 CFR 1.97 and 1.98 filed herewith and identifying various U.S. patents of relevance.

A primary practice in such prior art activity has been frequency-hopping, wherein the transmitting frequencies change with the passage of time for each participating station. Deman et al. U.S. Pat. Nos. 4,554,668 and 4,554,669 are seen as typical in this respect in formulating frequency-hopping laws applicable among the participating stations of a network. Such Deman et al. laws are provided for each station independently of one another. Other approaches in such prior art patents look to the synchronization of participating stations on a time basis, typically derived from transmissions and contents thereof.

From applicant's viewpoint, such prior art approaches to network radio communication do not provide as high a degree of statisfaction of the foregoing requirement, particularly as respects its second compromise aspect.

SUMMARY OF THE INVENTION

The present invention has as its primary object the provision of improved network radio communication systems.

It is a more particular object of the invention to provide a frequency-hopping type of network radio communication system having enhanced avoidance of compromise.

In quite specific objective, the invention looks to a network radio communication system wherein the compromise of a participating station may occur without attendant compromise of the network. In attaining the foregoing and other objects and features, the invention provides a system for effecting radio communication over a given range of frequency channels among a plurality of participating local stations, the system comprising: a variably settable channel transmission unit at each such participating local station; and a controller or central station having an interference array processor for receiving data characterizing the system and each such participating local station for assigning datum channels (frequencies) to each such participating station with prescribed channel spacing and what is termed a "book-page generator" for compiling data in successive book pages of initial and subsequent channel assignments for stations with maintenance of such datum channel spacing. Further data compilations are made from the book-page generator in what are termed "station pages", comprising frequency shift instructions specific to the stations. Since a station page is derived from plural book pages, any station may be compromised without revealing the contents of the book pages. Thus, any station page discloses only system information particular to that station. Neither system channel spacing nor the information particular to other stations is derivable from the compromised station.

For communication of stations pages from the central station, the central station may be in communication with all local stations, by omnidirectional radio communication therewith. Other communication in this respect may be effected, such as the preparation of records for stations at the central station and physical conveyance of such records to the participating stations.

Communication character of the network is not required to be of any specific variety and, for example, may be of time duplex or frequency duplex type or of the time duplex type known as time division multiple access (TDMA).

In respect of frequency allocation, the system is operative whether the available allocation is contiguous or segmented, i.e. whether the frequency allocation is a continuous frequency grouping or is comprised of spaced groups of frequencies. Where the frequency allocation is narrow, with a limited number of frequencies available, the system will serve to minimize interference.

The foregoing and other objects and features of the invention will be further understood from the following detailed description of preferred embodiments thereof and from the drawings wherein like reference numerals identify like parts and components throughout.

DETAILED DESCRIPTION OF PREFERRED EMBODIMENTS AND PRACTICES

Figure 1:
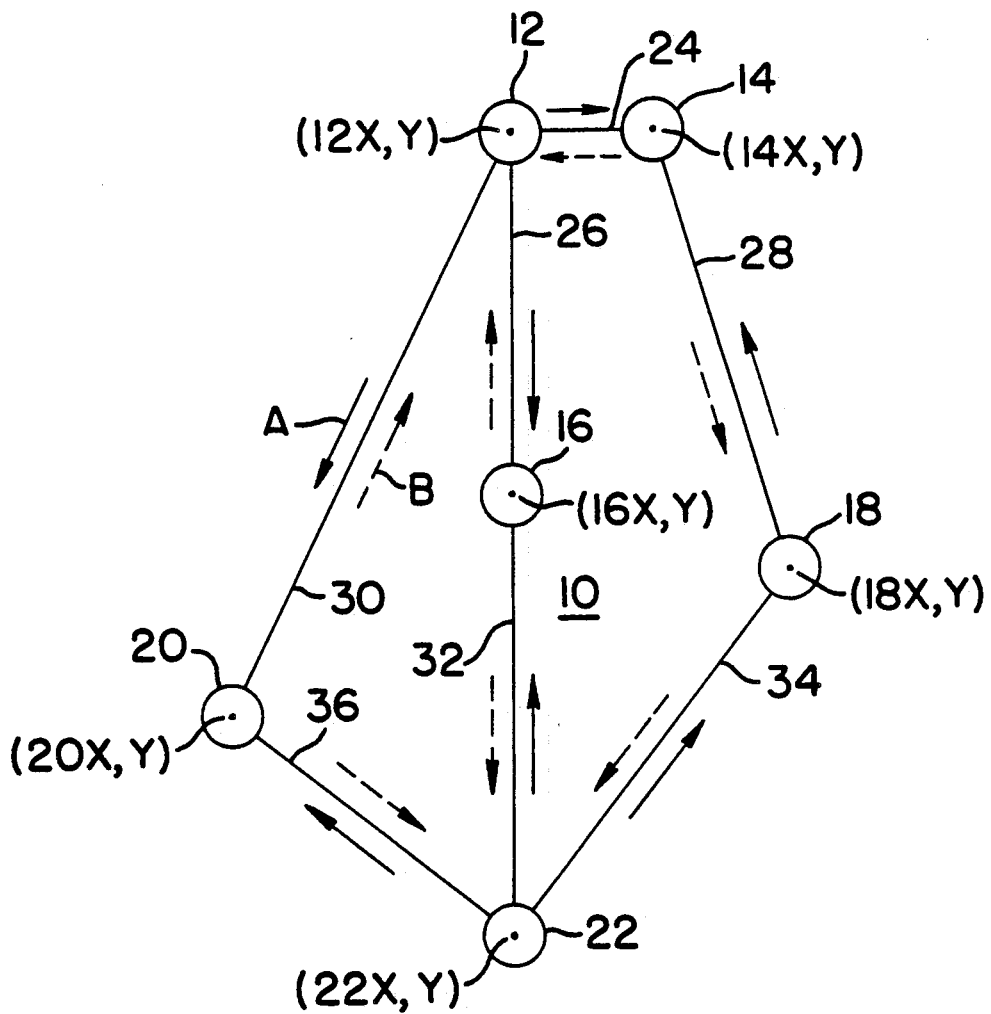
FIG. 1. is a graphic diagram of a typical radio network serviced by the system of the invention.

Referring to FIG. 1, a typical radio network 10 serviced by the invention includes six participating stations 12, 14, 16, 18, 20 and 22. Each station includes a radio transmitter and receiver (transceiver ) and communication between stations is directional over bidirectional links, i.e., bidirectional link 24, between stations 12 and 14, bidrectional link 26, between stations 12 and 16, bidirectional link 28, between stations 14 and 18, bidirectional link 30, between stations 12 and 20, bidirectional link 32, between stations 16 and and 22, and bidirectional link 34, between stations 18 and 22.

The FIG. 1. network involves time duplexing radios in the preferred embodiment and, accordingly, the network is separated into type A links, indicated by the solid line arrows aside each link, and type B links, indicated by the broken line arrows aside each link. It should be noted that, in TDMA systems, this would be expanded to include type C, D, etc., links as well.

Each of the type A and type B links is comprised of one station transmitter and one station receiver. All type A links transmit at one time, during which period, all type B links are silent, and all type B links transmit during another time, during which period, all type A links are silent. For example, one type A link includes the transmitter of station 22 and the receiver of station 16, and one type B link includes the transmitter of station 16 and the receiver of station 12.

The network participating stations have physical coordinates, such as are indicated for horizontal (X) and vertical (Y) directions as 12X,Y for station 12, 14X,Y for station 14, 16X,Y for station 16, 18X,Y for station 18, 20X,Y for station 20 and 22X,Y for station 22.

As alluded to above, the invention looks to frequency management among its participating stations(nodes). In an outset practice toward realization of this goal, attention is invited to FIG. 2, which sets forth steps for addressing the FIG. 1 network from a positional and available frequency spectrum basis. In the flow chart of FIG. 2, practice commences at START step 38 to IDENTIFY TRANSMIT AND RECEIVE NODES FOR TYPE A LINKS IN STEP 40. Progress is then to step 42—OBTAIN X AND Y OF TYPE A LIKE TRANSMIT NODES. Practice then advances to step 44 to IDENTIFY TRANSMIT AND RECEIVE NODES FOR TYPE B LINKS. Progress is then to step 46—OBTAIN X AND Y OF TYPE B LINK TRANSMIT NODES.

In step 48—OBTAIN RADIO TYPE FOR ALL TRANSMIT NODES—, the practice involves looking to the actual type of equipment selected for implementing each network radio. Then, in step 50—SET CHANNEL WIDTH—, the practice involves operator choice of the frequency bandwidth for each link.

From the composite data thus collected, namely, link identification, node coordinate identification, radio type indication and channel width specification, practice is then to step—COMPUTE A AND B INTERFERENCE ARRAYS—in step 52, and completion of practice in step 54—END—.

By way of example of activity in respect of the FIG. 1 network, the following coordinates in kilometers (K) from an origin are used: for station 12—12X is 30K and 12Y is 60K; for station 14—14X is 40K and 12Y is 60K; for station 16—16X is 30K; and 16Y is 35K; for station 18—18X is 50K and 18Y is 30K; for station 20—20X is 10K and 20Y is 20K and for station 22—22X is 30k and 22Y is 5K. All participating station radios are assumed to be of the same type, designated X below in Table 1 and channel separation is assumed to be 500 kilohertz. Table 1 is a resulting interference array, wherein rows are designated as RA through RI and columns are designated as CA through CN.

TABLE 1

|    | CA | CB | CC | CD | CE | CF | CG | CH | CI | CJ | CK | CL | CM | CN |
|----|----|----|----|----|----|----|----|----|----|----|----|----|----|----|
| RA | —  | —  | —  | —  | —  | —  | —  | A  | A  | A  | A  | A  | A  | A  |
| RB | —  | —  | —  | —  | —  | —  | —  | 36 | 26 | 34 | 28 | 32 | 30 | 24 |
| RC | A  | 22 | 20 | —  | —  | 1  | 36 | 0S | 0S | 2S | 0S | 3S | 5S | 0S |
| RD | A  | 12 | 16 | —  | —  | 2  | 26 | 0S | 0S | 0S | 2S | 5S | 5S | 3S |
| RE | A  | 22 | 18 | —  | —  | 3  | 34 | 2S | 0S | 0S | 12S| 4S | 1S | 0S |
| RF | A  | 18 | 14 | —  | —  | 4  | 28 | 0S | 0S | 12S| 0S | 1S | 0S | 5S |
| RG | A  | 22 | 16 | —  | —  | 5  | 32 | 4S | 5S | 4S | 2S | 0S | 2S | 0S |
| RH | A  | 12 | 20 | —  | —  | 6  | 30 | 5S | 5S | 0S | 1S | 0S | 0S | 2S |
| RI | A  | 12 | 14 | —  | —  | 7  | 24 | 0S | 2S | 0S | 6S | 0S | 0S | 0S |

Table 1may be regarded as comprising four quadrants: (i) a first (upper left) quadrant involving rows RA and RB and columns CA through CG, which may be used for formatting purposes, and is shown with nothing present (—) in the example; (ii) a second (upper right) quadrant involving rows RA and RB and columns CH through CN, row RA identifying the type of link at hand and row RB identifying links; a third (lower left) quadrant involving rows RC through RI and columns CA through CF; and a fourth (lower right) quadrant involving rows RC through RI and columns GG through CN.

The third quadrant of Table 1 indicates the type A link in its column CA, transmit nodes in column CB, receive nodes in column CC and link identification in column CF. Columns CD and CE of this quadrant may be used for sorting techniques, but are not used in this example.

The fourth quadrant of Table 1 present actual interference data represented in specified units of 500 kilohertz separations (S ).

In reading the interference array table and considering FIG. 1, one would expect a low interference level for link 24, running between stations 12 and 14, as against all links other than links 26 and 28. Table so indicates, showing a required separation level of 2S as against link 26 and a separation level of 6S as against link 28. Further, considering the worst possible interference situation, and again considering Table 1 and FIG. 1, one would expect the highest level of mutual interference, in type A link node of transmission, as occurring between the receiver on link 34, running from station 22 to station 18, and the transmitter on link 28, running from station 18 to station 14. This is evidenced in Table 1 by the requisite separation of 12S, appearing both at the intersection of row RE and column CK and at the intersection of row RF and column CJ.

As will be appreciated, Table 1 provides a datum measure of separation among the various involved type A links. In accordance with the invention, such datum measure of channel separation is maintained in the course of frequency-hopping, as is discussed in detail below.

Figure 2:
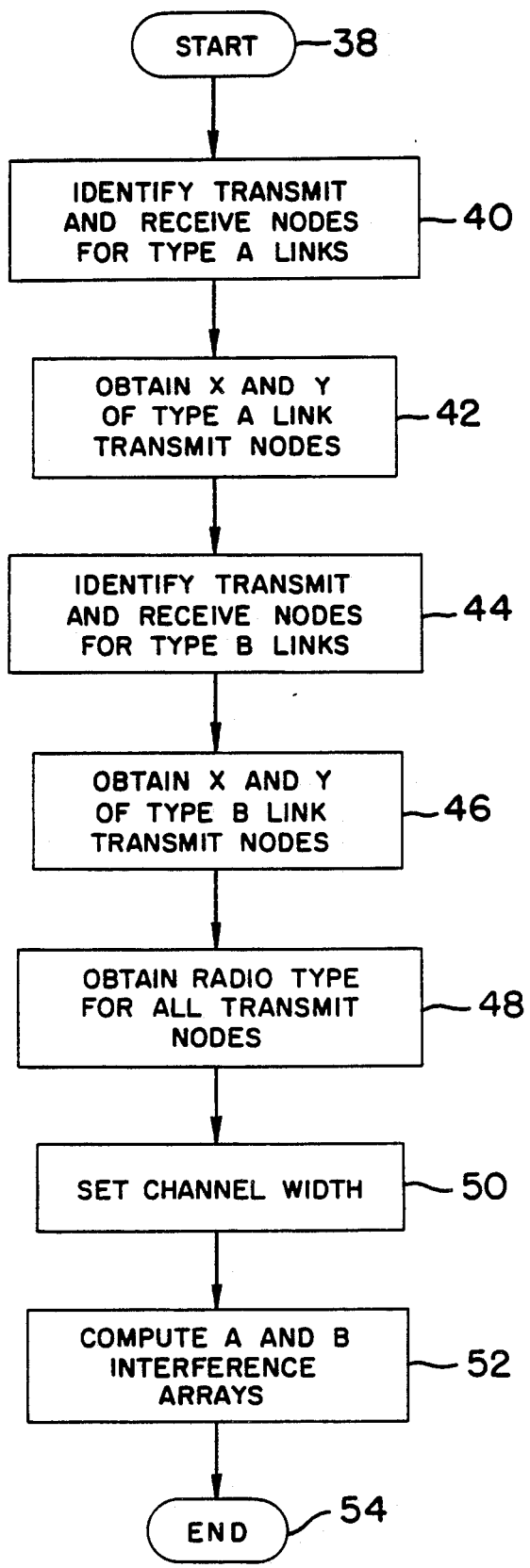
FIG. 2 is a flow chart of steps involved in the interference array processor of FIG. 3.
Figure 3:
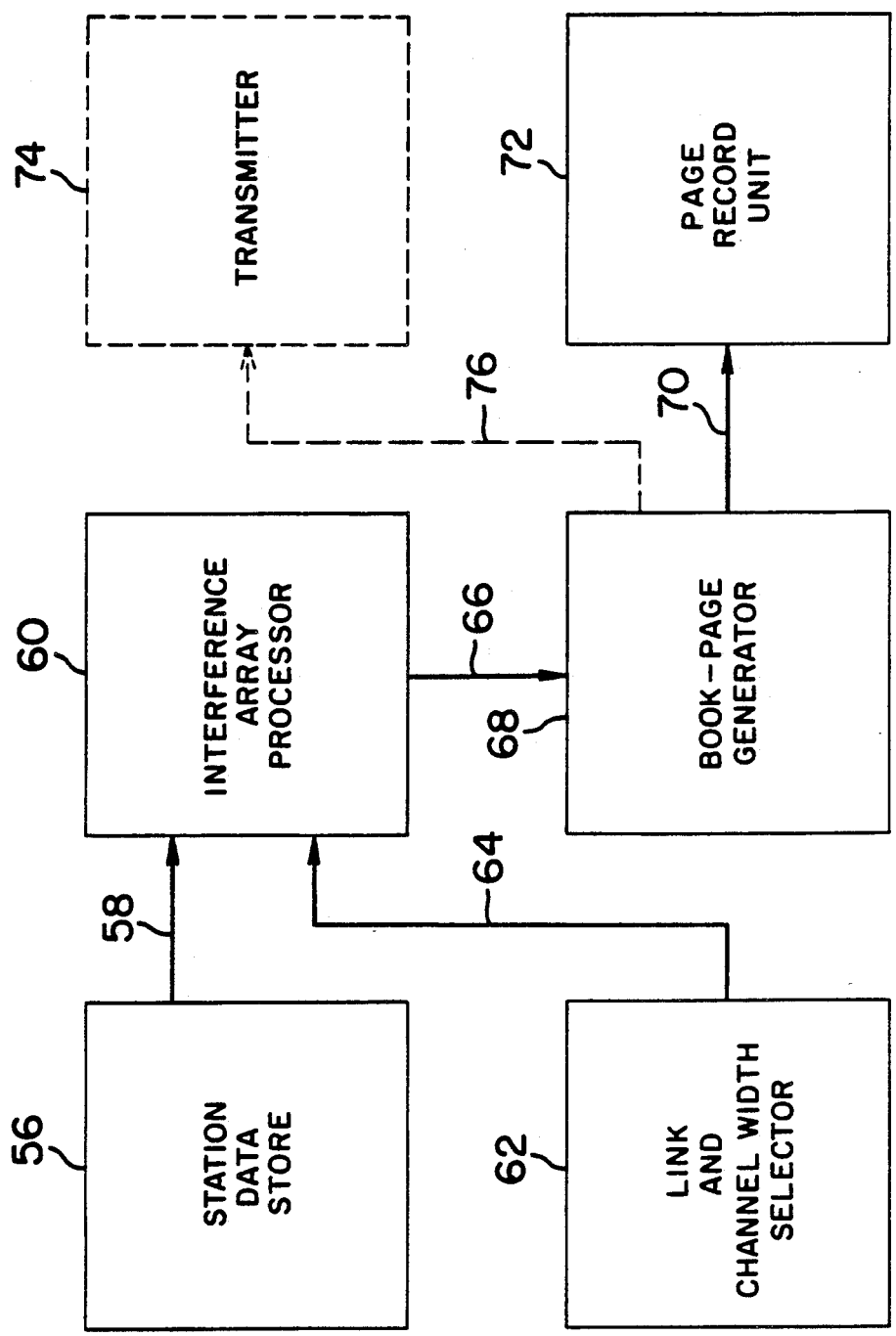
FIG. 3 is a block diagram of the system of the invention in its individual participating station implementation.

Referring now to FIG. 3, it presents a block diagram of a controller for implementing the network of FIG. 1 in respect of providing to individual participating stations directions for transmission frequencies with the passage of time to effect frequency-hopping. Station data store 56 contains signals indicative, for each participating station, of positional coordinates (X and Y) and station equipment type and generates output signals on inquiry on lines 58 to interference array processor 50. Processor 60, which may be comprised of a suitably programmed miscroprocessor, implements the program set forth in the flow chart of FIG. 2 and otherwise controls the data gathering requirements of the invention. Thus, processor 60 operates to make such inquiry of store 60 to obtain positional coordinate information and equipment type data.

link and channel width selector 62 is operator (user) controllable to provide output signals on lines 64 to processor 60 which are indicative of operator-selected links for the network, such as are indicated in the FIG. 1 example, and operator channel width, e.g., the 500 kilohertz channel width above discussed.

Processor 60 provides output signals on lines 66, indicative of the results of its implementation of the FIG. 2 program as shown in Table 1 to book-page generator 68. Generator 68 is thereby apprised particularly of the datum channel separation among the participating stations in both links of type A and type B.

Book-page generator 68 is operative, as is discussed in detail in connection with FIG. 4 below, to compile a directory of frequency assignments for each participating station in the FIG. 1 network, with the passage of time, while maintaining the datum separation as provided in the lines 66 input signals thereto from processor 60. Output signals, per station, are produced on output lines 70 to page record unit 72. In this connection, the invention looks to the preparation of station page records, deliverable physically to the various stations participating in the network, or alternatively, to the radio transmission of such station page records to the stations. In latter respect, the invention contemplates a unidirectional transmitter 74 at the controller and application thereto from generator 68 over lines 76 of signals indicative of station page records.

Figure 4:
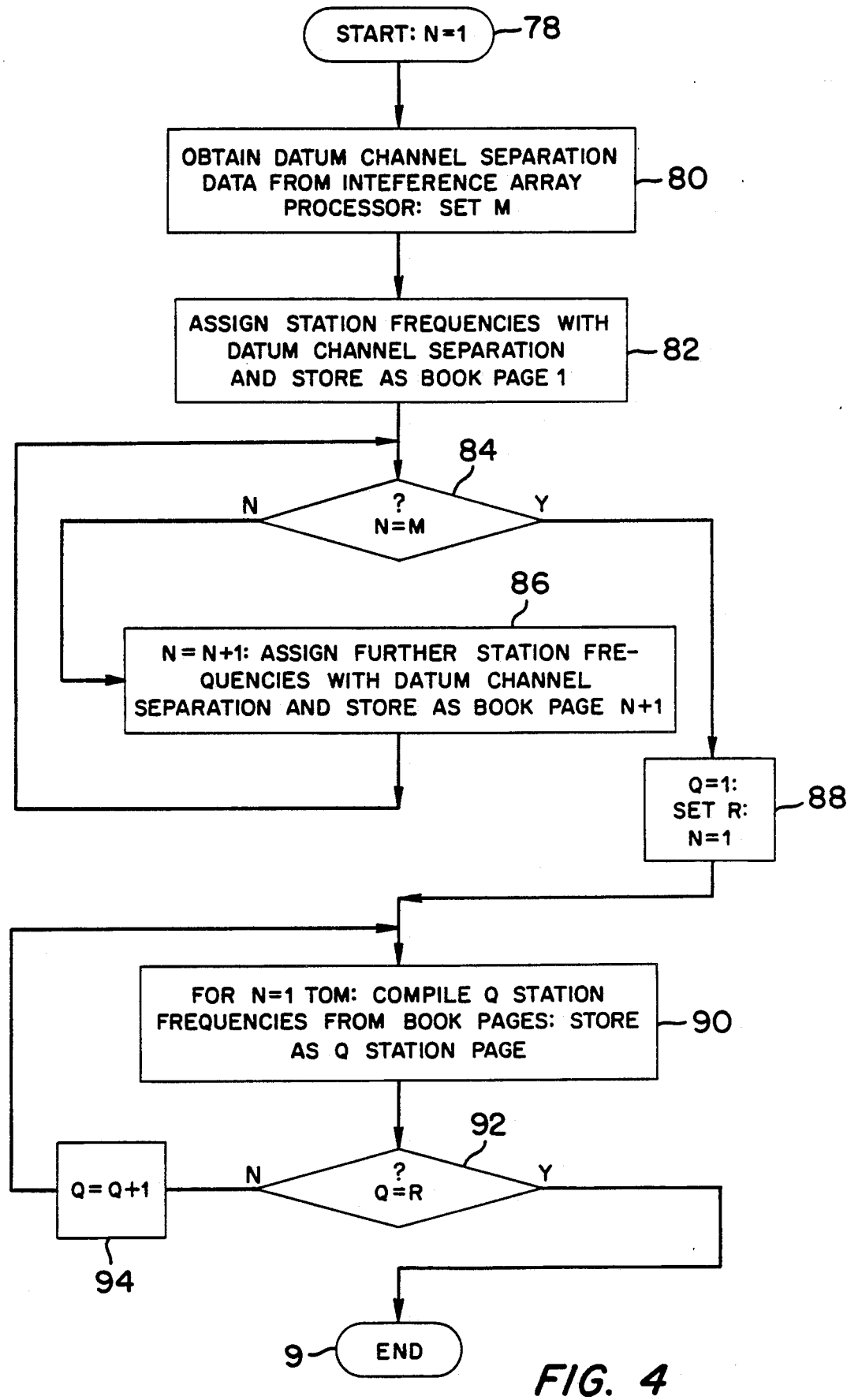
FIG. 4 is a flow chart of steps involved in the book-page generator of FIG. 3.

Referring to FIG. 4, the flow chart thereof is indicative of operations within book-page generator 68 of FIG. 3 and is entered in step 78—START: N=1

Progress is from step 78 to step 80—OBTAIN DATUM CHANNEL SEPARATION DATE FROM INTERFERENCE ARRAY PROCESSOR: SET M. In this step, the data of the fourth quadrant above of FIG. 2 is obtained by the book-page generator and M is the number of pages of the book, i.e., the user-selected or otherwise prescribed number of frequency hops to be effected within each cycle of system operation.

In step 82, —ASSIGN STATION FREQUENCIES WITH DATUM CHANNEL SEPARATION AND STORE AS BOOK PAGE 1 —, generator assigns a given frequency to a first participating station and proceeds therefrom to assign frequencies to other participating stations, using the datum channel separation. The result, a page listing the frequencies and station identifications is stored.

In step 84, —?N=M—, inquiry is made as to whether book-page compilation is complete. Since N=1 at this stage and the number of book pages is six in the example at hand, the step 84 inquiry is answered in the negative and progress is to step 86—N=N+1: ASSIGN FURTHER STATION FREQUENCIES WITH DATUM CHANNEL SEPARATION AND STORE AS BOOK PAGE N+1—.

Practice in step 84 is preferably to select a further channel for the first participating station through randomization and to proceed therefrom to assign other station frequencies within the constraint of making such other station frequency selection with respect for the datum, non-interfering, channel separation.

Following such step 86 practice, progress is back to step 84 and inquiry as to whether book-page compilation is complete. As will be appreciated, in the six station example at hand, the book-page generator will cycle through steps 84 and 86 to compile six book pages, at which time the inquiry of step 84 will be answered in the affirmative, leading practice to step 88 —Q=1: SET R: N=1—. R is the number of participation stations and indicates the number of station pages which need be created.

In step 90, —FOR N=1 TO M: COMPILE Q STATION FREQUENCIES FROM BOOK PAGES: STORE AS Q STATION PAGE —, generator 68 selects, in the given example, the first station frequency from each of its compiled M book pages and thus prepares a record for the first station of M frequencies assigned thereto.

Since Q, at this time, is equal to one (first station page), the inquiry in step 92, —?Q=R —, is answered in the negative, step 90 is repeated, however, with Q advanced by one in step 94 —Q=Q+1 —.

At such time as the inquiry in step 92 is answered in the affirmative, namely, where all station pages have been compiled and stored, progress is to step 95 —END—.

Figure 5:
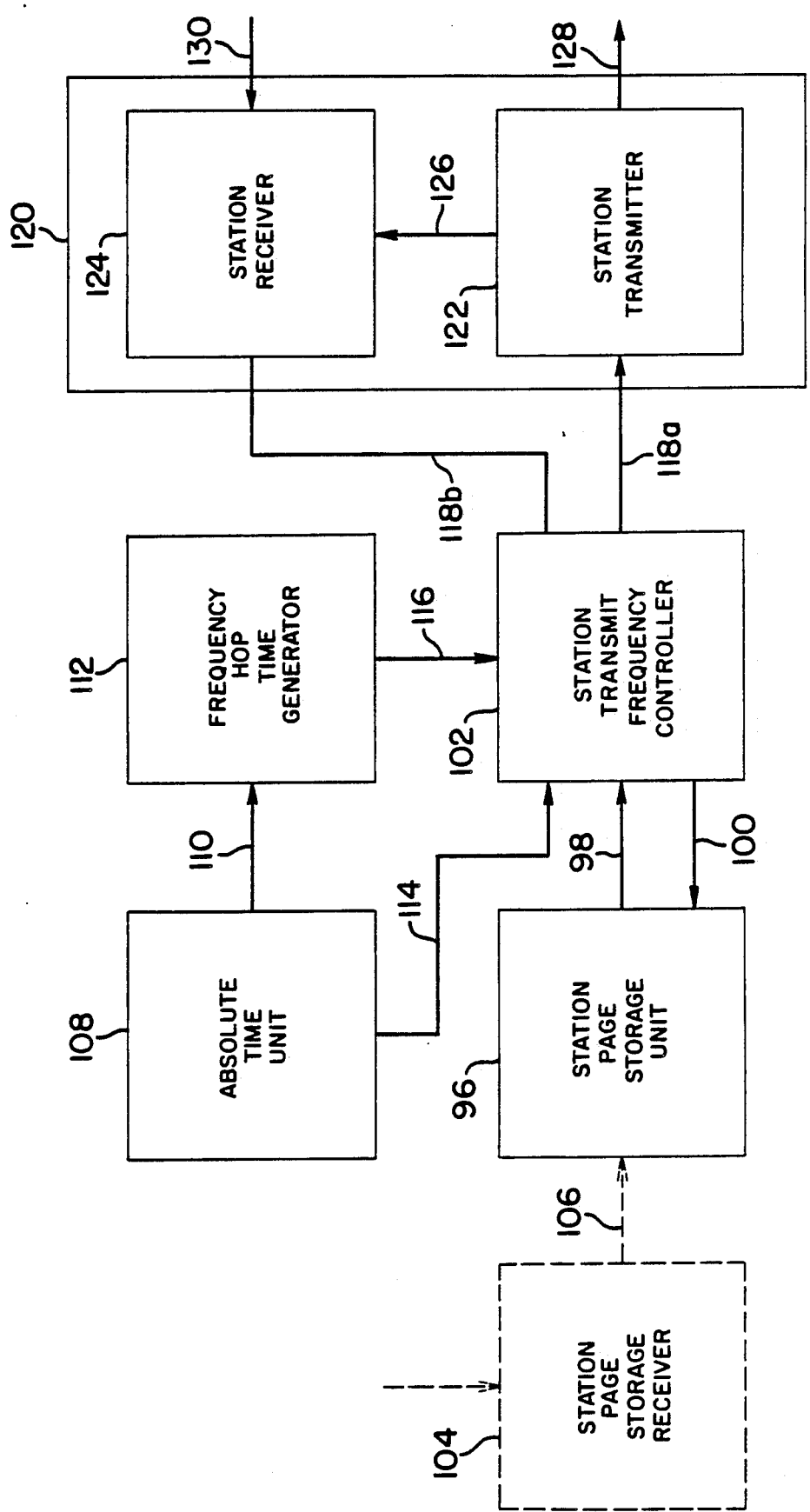
FIG. 5 is a block diagram of a controller central to the participating stations of the network of FIG. 1.

Referring to FIG. 5, a block diagram of the structure of individual stations of the FIG. 1 network is seen. Station page storage unit 96 furnishes frequency assignments to the station over lines 98, upon inquiry over lines 100, to station transmit frequency controller 102. As above alluded to, a station may receive such frequency assignment (station page data) either by direct physical record transported thereto or by radio communication from the controller of FIG. 3. In the former connection, such physical record is read and stored in unit 96 directly from such record, whereas, in the latter respect, the station is equipped with a station page storage receiver 104. Receiver 104 receives the transmitted output of transmitter 74 of FIG. 3 and furnishes signals indicative of such assignments over line 106 to station page storage unit 96.

Each station of the FIG. 1 network includes an absolute time unit 108, all such units being synchronized and constituted of atomic clock devices or the like. Absolute time unit 108 furnishes indication of absolute time of day over line 110 to frequency hop generator 112 and over line 114 to station transmit frequency controller 102. The output of frequency hop generator indicates frequency hop events, which may be set to occur at any suitable intervals with respect to the absolute time, cyclic or otherwise.

Upon each receipt of a line 116 hop signal, i.e., transmit frequency change indication, controller 102 inquires over lines 100 of station page storage unit 96 of the transmitting frequency actually to be used at that time and until receipt of the ensuing lines 100 signal. Output lines 118a and 118b of controller 102 are accordingly set in frequency and transceiver 120 of the station operates its station transmitter 122 and its station transmitter at the indicated frequencies. Signals for transmission are applied over line 128 to a station directional antenna and signals received from other station transmitters are received over line 130.

In its comprise avoidance aspect, the system of the invention will be seen to effect radio communication among Q participating radio stations with avoidance of system communication compromise despite comprise of any such participating station. The method practiced in the system as described has steps of: (a) determining datum channel separations among the stations; (b) determining M sets of Q transmission channels to form a transmission channel book of M pages, each such page having Q channel entries, the Q transmission channels of each page being separated in accordance with the datum channel separations; and (c) compiling from the M pages of the transmission channel book Q different sets of transmission channels and providing a distinct one of the Q different sets of transmission channels to each such participating station.

Compromise of an individual station will yield only its station page, which is without indication of datum channel separation or channels of other stations.

Various changes may evidently be introduced to the foregoing system embodiments and modifications may be made to the practices described without departing from the invention. The particularly disclosed and depicted preferred embodiments and methods are accordingly intended in an illustrative and not in a limiting sense. The true spirit and scope of the invention is set forth in the appended claims.

What is claimed is:

1. A system for effecting radio communication among a plurality of participating stations, comprising:
   (a) a variably settable channel transmission unit at each such station;
   (b) controller means for determining datum channel separations among said stations and assigning first transmission channels individually to said stations in such datum channel spacing and assigning second transmission channels for use by said stations successively to use thereof of said first transmission channels, said second transmission channels being different from said first transmission channels and being in such datum channel spacing, said controller means being operative to make a first compilation of channel assignments collective of all such channel assignments for all stations and further to make second compilations from said first compilation, each said second compilation being specific to a distinct one of said stations and containing the channel assignment for such station.

2. The system claimed in claim 1 further including means for transmitting signals indicative of said second compilations to said stations.

3. The system claimed in claim 1 further including means for making individual records of said second compilations, each of said stations including means for receiving an individual such record and generating signals indicative of the channel assignments therein.

4. The system claimed in claim 1 wherein each said station includes means for generating first signals indicative of absolute time of day, means for generating second signals identifying specific times of a day for change of transmitting channel, means generating third signals indicative of such channel assignments provided by said controller means, and means responsive to said first, second and third signals for controlling the operating channel of said station.

5. In a system for effecting radio communication among Q participating stations operable successively jointly at M different transmission channel settings, a controller, comprising:
   (a) means for determining datum channel separations among said stations;
   (b) means for assigning first transmission channels individually to said stations in such datum channel spacing;
   (c) means for assigning second to Mth transmission channels for use by said stations individually successively to use thereof of said first transmission channels, said second transmission channels being different from said first transmission channels and being in such datum channel spacing;
   (d) means for making M first compilations, each such first compilation being inclusive of a channel assignment for each such station; and
   (e) means for making Q second compilations from said M first compilations, each such second compilation being inclusive of channel assignments for a distinct one of said Q stations.

* * * * *